US007260802B2

(12) United States Patent
Ho et al.

(10) Patent No.: US 7,260,802 B2
(45) Date of Patent: Aug. 21, 2007

(54) METHOD AND APPARATUS FOR PARTITIONING AN INTEGRATED CIRCUIT CHIP

(75) Inventors: Pei-Hsin Ho, Portland, OR (US); Yongseok Cheon, Portland, OR (US)

(73) Assignee: Synopsys, Inc., Mountain View, CA (US)

( * ) Notice: Subject to any disclaimer, the term of this patent is extended or adjusted under 35 U.S.C. 154(b) by 63 days.

(21) Appl. No.: 11/159,950

(22) Filed: Jun. 23, 2005

(65) Prior Publication Data

US 2006/0101365 A1    May 11, 2006

Related U.S. Application Data

(60) Provisional application No. 60/626,048, filed on Nov. 8, 2004.

(51) Int. Cl.
*G06F 17/50* (2006.01)
(52) U.S. Cl. ............... 716/7; 716/8; 716/9; 716/10; 716/11
(58) Field of Classification Search ............... 716/7–11
See application file for complete search history.

(56) References Cited

U.S. PATENT DOCUMENTS

| 4,908,772 | A | * | 3/1990 | Chi | 716/10 |
|---|---|---|---|---|---|
| 5,202,840 | A | * | 4/1993 | Wong | 716/7 |
| 5,532,934 | A | * | 7/1996 | Rostoker | 716/10 |
| 5,566,078 | A | * | 10/1996 | Ding et al. | 716/8 |
| 5,629,860 | A | * | 5/1997 | Jones et al. | 716/6 |
| 5,682,321 | A | * | 10/1997 | Ding et al. | 716/8 |
| 5,808,899 | A | * | 9/1998 | Scepanovic et al. | 716/2 |
| 5,838,583 | A | * | 11/1998 | Varadarajan et al. | 716/9 |
| 6,536,024 | B1 | * | 3/2003 | Hathaway | 716/6 |
| 6,823,500 | B1 | * | 11/2004 | Ganesh et al. | 716/9 |
| 6,851,099 | B1 | * | 2/2005 | Sarrafzadeh et al. | 716/10 |
| 7,032,198 | B2 | * | 4/2006 | Sano et al. | 716/5 |
| 7,036,103 | B2 | * | 4/2006 | Miller et al. | 716/9 |
| 2003/0084416 | A1 | * | 5/2003 | Dai et al. | 716/7 |
| 2004/0006750 | A1 | * | 1/2004 | Cheng et al. | 716/3 |
| 2004/0040007 | A1 | * | 2/2004 | Harn | 716/11 |
| 2006/0053396 | A1 | * | 3/2006 | Eng | 716/7 |

* cited by examiner

*Primary Examiner*—Vuthe Siek
*Assistant Examiner*—Naum Levin
(74) *Attorney, Agent, or Firm*—Park, Vaughn & Fleming LLP; Gilbert C. Wong (57) ABSTRACT

A system that partitions an integrated circuit. First, the system receives a placement for an integrated circuit. The system then calculates a joint-utilization ratio for pairs of logic modules in the placement. Next, the system sorts the pairs of logic modules based on the joint-utilization ratio. The system then selects top pairs of logic modules based on the joint-utilization ratio and clusters the top pairs of logic modules into new partitions.

20 Claims, 8 Drawing Sheets

METHOD AND APPARATUS FOR PARTITIONING AN INTEGRATED CIRCUIT CHIP

RELATED APPLICATION

This application hereby claims priority under 35 U.S.C. § 119 to U.S. Provisional Patent Application No. 60/626,048 filed 8 Nov. 2004, entitled "Placement Based Design Partitioning," by inventors Pei-Hsin Ho and Yongseok Cheon.

BACKGROUND

1. Field of the Invention

The present invention relates to techniques for partitioning the design of an integrated circuit (IC) chip into smaller design blocks.

2. Related Art

Advances in semiconductor technology presently make it possible to integrate large-scale systems, including tens of millions of transistors, onto a single semiconductor chip. Integrating such large-scale systems onto a single semiconductor chip increases the speed at which such systems can operate, because signals between system components do not have to cross chip boundaries, and are not subject to lengthy chip-to-chip propagation delays. Moreover, integrating large-scale systems onto a single semiconductor chip significantly reduces production costs, because fewer semiconductor chips are required to perform a given computational task.

However, as integrated circuit (IC) designers integrate more system components onto a single chip, IC designs are reaching and exceeding the limits of the IC design tools, specifically the logic optimization and detailed place-and-route tools. For instance, Synopsys Physical Compiler®, Synopsys Astro®, and Synopsys Galileo® have capacity limits of approximately one million instances. For larger IC designs, the IC designer must partition the design into smaller design blocks, called "soft macros" or "physical partitions," using a floorplanner such as Synopsys JupiterXT®. Each soft macro or physical partition contains a set of logical modules of the design. When using a floorplanner such as JupiterXT®, the IC designer must manually partition the design. Other floorplanning tools employ techniques to automatically partition the design to minimize pin count.

As chip designs become larger, the task of manually or automatically partitioning a chip into physical partitions, while accounting for timing and pin count constraints, becomes progressively more difficult. Cells belonging to different physical partitions are placed, optimized, and routed within their own disjoint layout areas, which can result in inter-block wires that are longer than intra-block wires. Since wire delay dominates the overall chip delay, these longer intra-block wires can have an adverse effect on circuit timing.

Figure 1A:
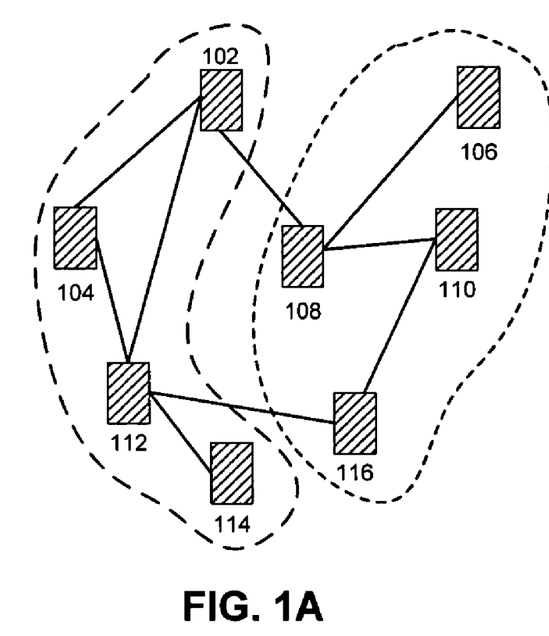
FIG. 1A illustrates an exemplary partitioning of a layout.

FIG. 1A illustrates an exemplary partitioning of a layout containing cells 102, 104, 106, 108, 110, 112, 114, and 116. The lines between these cells indicate which cells communicate with each other.

One technique for partitioning an IC design is to reduce the inter-partition wires by searching for a "min-cut" line. This technique is analogous to reducing pin count in a partition. Using this technique, cells 102, 104, 112 and 114 are placed in one partition, and cells 106, 108, 110, and 116 are placed in another partition.

Figure 1B:
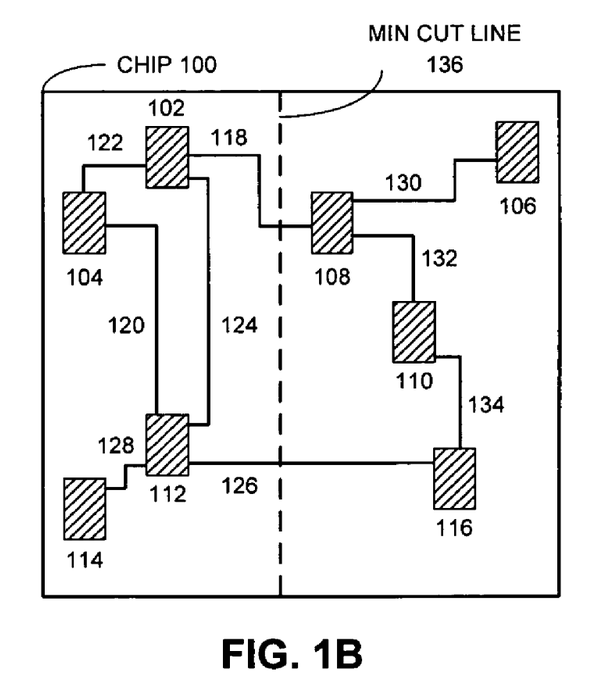
FIG. 1B illustrates an exemplary placement of cells within a chip which is divided into two partitions.

FIG. 1B illustrates an exemplary placement of cells within a chip 100 which is divided into two partitions. Chip 100 contains the same cells as in FIG. 1A as well as wires 118, 120, 122, 124, 126, 128, 130, 132, and 134. FIG. 1B also illustrates min-cut line 136. The place-and-route tool places and routes each partition of the chip separately. As a result, the placement and routing in each partition is optimized, but the placement and routing between the partitions is not optimized. For instance, since cells 110 and 116 communicate with each other, the place-and-route tool places cells 110 and 116 close together, making wire 134 relatively short. Similarly, since cells 112 and 114 communicate with each other, the place-and-route tool places cells 112 and 114 close together, making wire 128 relatively short.

However, cell 116 also communicates with cell 112. Since each partition was placed and routed separately, wire 126, which connects cells 112 and 116 is relatively long, which may cause timing problems.

Hence, what is needed is a method and an apparatus for automatically partitioning an IC layout without the problems described above.

SUMMARY

One embodiment of the present invention provides a system that partitions an integrated circuit. First, the system receives a placement for an integrated circuit. The system then calculates a joint-utilization ratio for pairs of logic modules in the placement. Next, the system sorts the pairs of logic modules based on the joint-utilization ratio. The system then selects top pairs of logic modules based on the joint-utilization ratio and clusters the top pairs of logic modules into new partitions.

In a variation on this embodiment, selecting the top pairs of logic modules involves selecting a user-specified number of top pairs of logic modules to be clustered.

In a variation on this embodiment, the joint-utilization ratio indicates the extent to which cells of a pair of logic modules are co-mingled. In this variation the joint-utilization ratio is calculated by dividing a total cell area of the pair of logic modules by an area of a bounding box containing the pair of logic modules. Note that a higher joint-utilization ratio indicates that the pair of logic modules has a preference to be clustered together.

In a variation on this embodiment, the system determines if an instance limit of a partition has been reached. If so, the system terminates the clustering process. Otherwise, the system continues to cluster pairs of logic modules into the partition until the instance limit of the partition has been reached.

In a variation on this embodiment, the instance limit is determined by an instance limit imposed by a place-and-route tool.

In a variation on this embodiment, the instance limit is determined by a number of instances per partition, which is calculated by dividing a total number of instances by a user-specified number of partitions. Note that the instance limit does not exceed an instance limit imposed by a place-and-route tool.

In a variation on this embodiment, the system calculates Rent's exponent to facilitate minimizing pin count. Rent's exponent is the logarithm of the pin count divided by the logarithm of the instance count for a pair of logic modules. Note that a lower Rent's exponent indicates a lower pin count.

In a variation on this embodiment, the system calculates the sensitivity of the joint-utilization ratio and the sensitivity of Rent's exponent. The system then calculates the linear combination of the sensitivity of the joint-utilization ratio and the sensitivity of Rent's exponent. Finally, the system maximizes the sensitivity of the linear weight. A tunable parameter can be used to scale the sensitivity of the joint-utilization ratio relative to the sensitivity of Rent's exponent, thereby facilitating a trade-off between optimizing timing and optimizing pin count.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Placement-Based Partitioning

The present invention automatically partitions a chip using a flat placement. In one embodiment of the present invention, the system uses a timing-driven placement technique. A timing-driven placement technique places cells to optimize timing. In another embodiment of the present invention, the system uses a power-driven placement technique. A power-driven placement technique places cells to minimize power consumption. In yet another embodiment of the present invention, the system optimizes for both power consumption and timing. Note that other types of placement techniques can be used. Also note that the placement is a flat placement, which does not retain hierarchical information about the logic modules.

Note that these placements are coarse placements, which are used only for partitioning the chip. Logic optimization and detailed place-and-route have not been performed on these placements. After partitioning the chip, the system optimizes the logic and performs a detailed place-and-route within each partition.

Figure 2A:
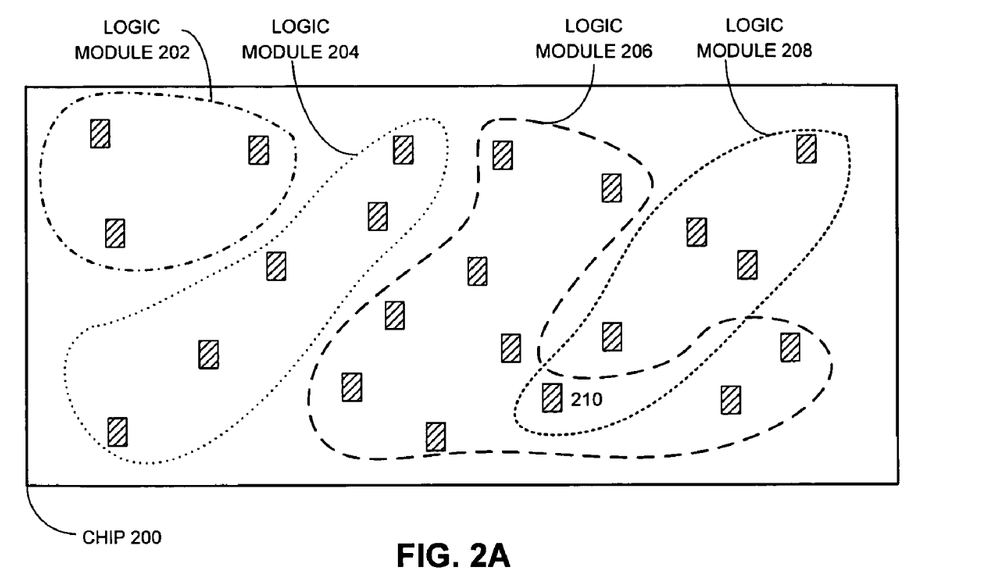
FIG. 2A illustrates a placement of logic modules.

FIG. 2A illustrates a placement of logic modules on a chip 200. Chip 200 contains logic modules 202, 204, 206, and 208, wherein each logic module is comprised of a number of cells, such as cell 210. Note that a cell can contain several gates. Cell 210 is located within the boundaries of both logic module 206 and logic module 208. In other words, cells within logic modules 206 and 208 co-mingle. The place-and-route tool decided that cell 210 needs to be close to the cells in logic module 206 and therefore placed cell 210 within the boundary of logic module 206. Note that cell 210 is still part of logic module 208, but it may be placed far from the other cells within logic module 208.

Figure 2B:
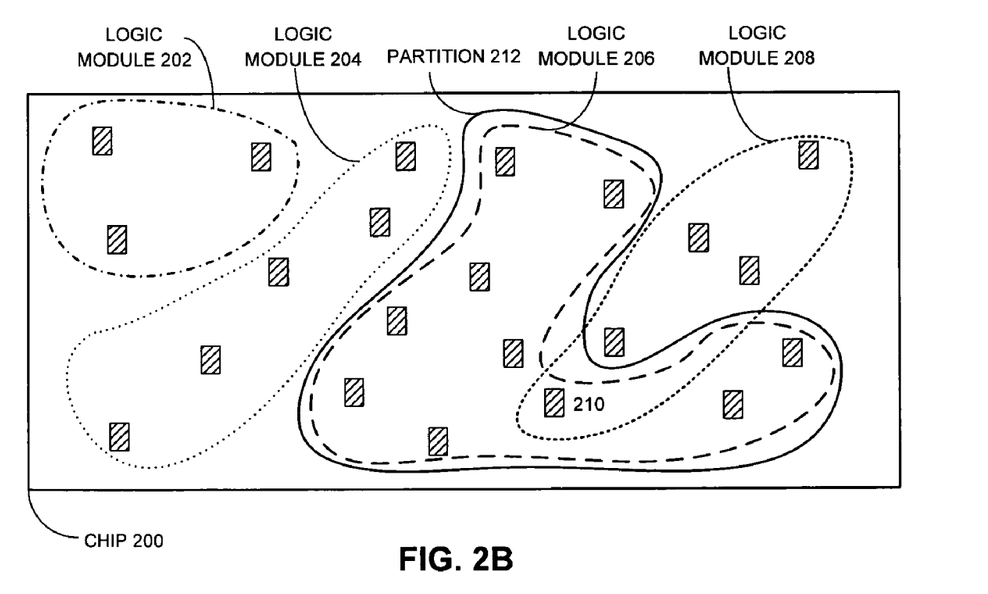
FIG. 2B illustrates a placement of logic modules with a non-optimal partition.

FIG. 2B illustrates a placement of logic modules with a non-optimal partition. It contains the same elements as FIG. 2A as well as new partition 212. In this case, partition 212 encloses the area covered by logic module 206. The logic optimization and place-and-route tool will optimize partition 212, which includes cell 210. As a result of this optimization, the place-and-route tool may decide to place cell 210 far away from the rest of logic module 208, which will cause any intra-partition wires between cell 210 and the other cells within logic module 208 to be long, which can adversely affecting timing.

Figure 2C:
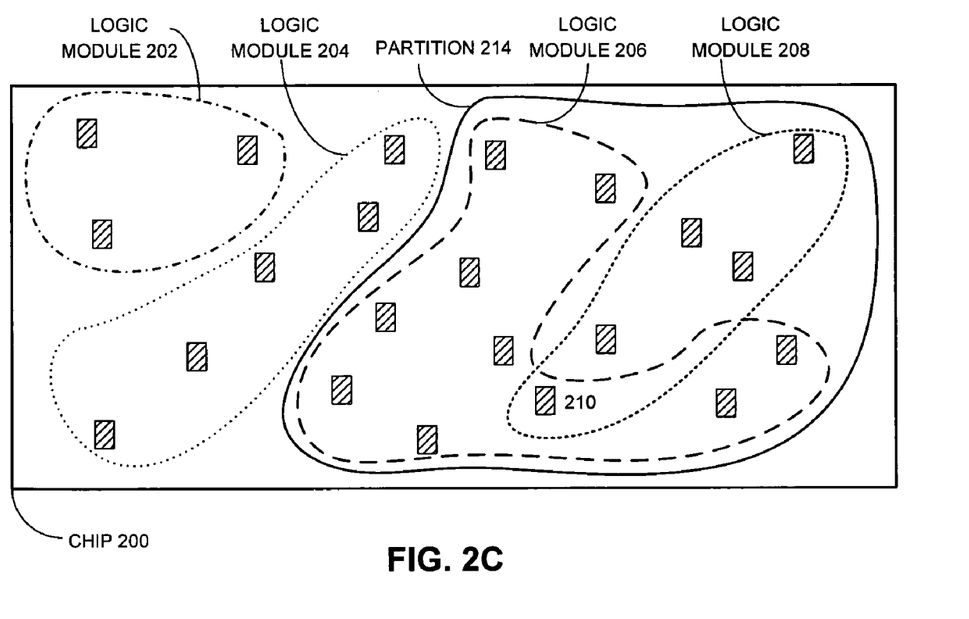
FIG. 2C illustrates a placement of logic modules with an optimal partition in accordance with an embodiment of the present invention.

FIG. 2C illustrates a placement of logic modules with an optimal partition in accordance with an embodiment of the present invention. It contains the same elements as FIG. 2A as well as new partition 214. When the logic optimization and place-and-route tool optimize new partition 214, the intra-partition wire length concerns discussed in regards to FIG. 2B are no longer an issue because partition 214 encloses both logic modules 206 and 208. Therefore, if two logic modules have cells that co-mingle, there is a benefit in placing those two logic modules within the same partition.

Note that the partitions can be different sizes. Also note that partitions do not necessarily need to be rectangular. Partitions can be rectilinear or any other shape that the place-and-route tool supports.

Joint-Utilization Ratio and Rent's Exponent

In one embodiment of the present invention, the system places two logic modules into the same physical partition if the cells from those two logical modules are co-mingled with each other in a flat placement of the design. The joint-utilization ratio between two logic modules (or partitions) indicates the degree of co-mingling between the cells of two logic modules (or partitions). The higher the joint-utilization ratio, the more co-mingling there is between the two logic modules (or partitions) and the more the two logic modules (or partitions) want to be placed together. Also note that a higher joint-utilization ratio means that the partition will mimic the metric used to optimize the flat placement. For instance, if a power metric was used to generate the flat placement, a higher joint-utilization ratio between two logic modules (or partitions) means that those two logic modules (or partitions) will tend to maintain the power optimization if placed in the same partition.

Figure 3A:
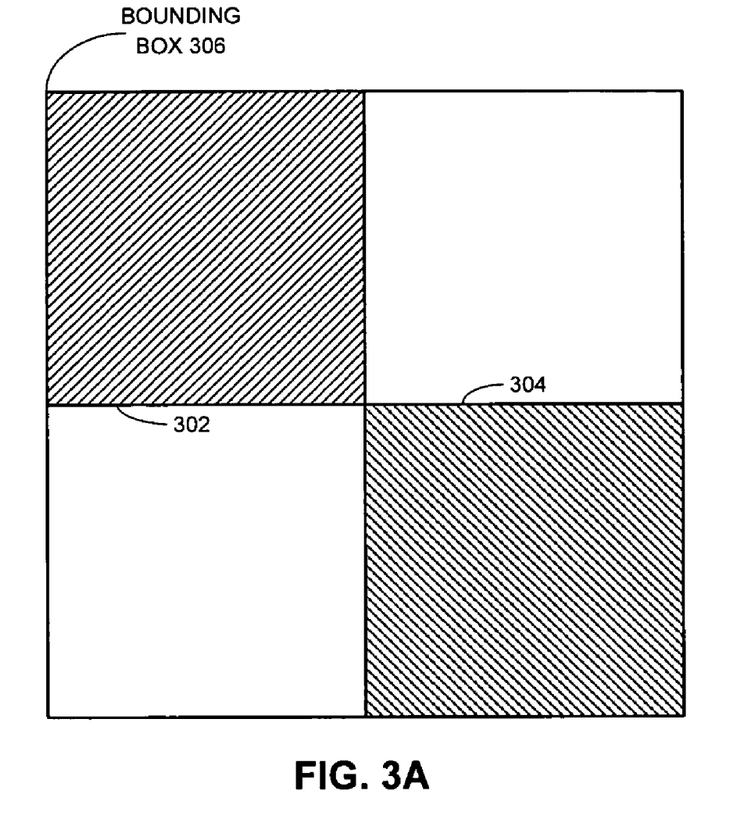
FIG. 3A illustrates the calculation of the joint-utilization ratio for a non-optimal clustering of cells in accordance with an embodiment of the present invention.

FIG. 3A illustrates the calculation of the joint-utilization ratio for a non-optimal clustering of cells in accordance with an embodiment of the present invention. It contains logic modules 302 and 304, and bounding box 306. For example, logic modules 302 and 304 each have a 50% utilization ratio. The utilization ratio is the total cell area divided by the area of the bounding box for the logic module. The joint-utilization ratio is the total cell area of both logic modules divided by the bounding box enclosing both logic modules. In this case, the joint-utilization ratio is (0.5+0.5)/4=0.25 (i.e. 25%).

Figure 3B:
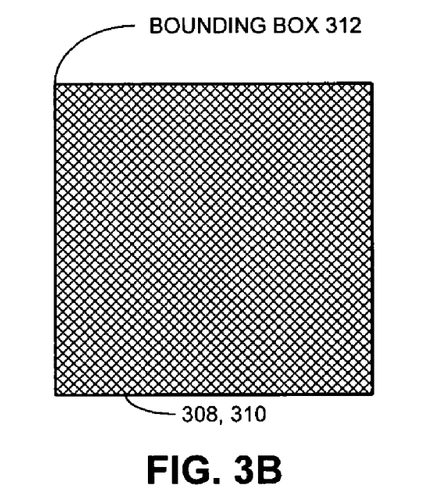
FIG. 3B illustrates the calculation of the joint-utilization ratio for an optimal clustering of cells in accordance with an embodiment of the present invention.

FIG. 3B illustrates the calculation of the joint-utilization ratio for an optimal clustering of cells in accordance with an embodiment of the present invention. It contains logic modules 308 and 310, and bounding box 312. Logic modules 308 and 310 are perfectly co-mingled within bounding box 312. As a result, the joint-utilization ratio is (0.5+0.5)/1=1 (i.e. 100%).

The "sensitivity" of the joint-utilization ratio ($\Delta\mu$) is defined as the joint-utilization ratio for the pair of logic modules (or partitions) minus the utilization ratio of the first logic module (or partition) plus the joint-utilization ratio for the pair of logic modules (or partitions) minus the utilization ratio of the second logic module (or partition). In one embodiment of the present invention, the system clusters logic modules that maximize the sensitivity of the joint-utilization ratio.

Figure 4:
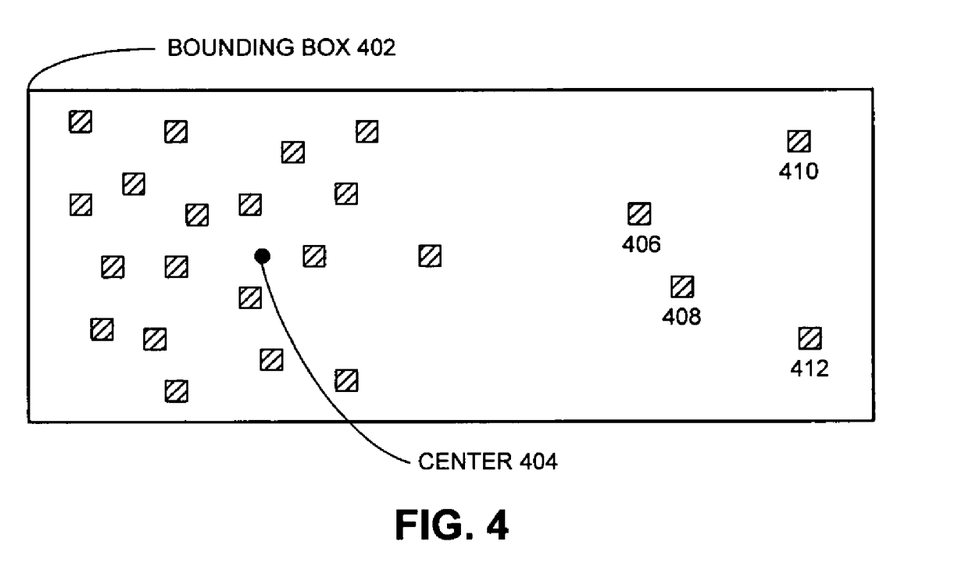
FIG. 4 illustrates the determination of the center of a bounding box area in accordance with an embodiment of the present invention.

FIG. 4 illustrates the determination of the center of the bounding box area in accordance with an embodiment of the present invention. It contains bounding box 402, center 404, and outlying cells 406, 408, 410, and 412. The center of the bounding box can be found by finding the center-of-gravity of the placed cells. Note that since most of the cells within the bounding box are clustered on the left side, those cells will be given a higher weight than outlying cells 406, 408, 410, and 412. As expected, center 404 is within the cluster of cells on the left side within bounding box 402.

Note that the system uses the joint-utilization ratio of the partition and finds a new bounding box for the partition by calculating the center-of-gravity and drawing a box around the cells in the original partition that satisfies the joint-utilization ratio. This new bounding box may or may not enclose outlier cells such as cells 406, 408, 410, and 412 in FIG. 4.

In one embodiment of the present invention, the system minimizes pin count. Rent's exponent can be used as a proxy for pin count. Rent's exponent is equal to the logarithm of the pin count divided by the logarithm of the instance count. A smaller Rent exponent indicates that the partition has fewer pins than a partition with a larger Rent exponent.

The "sensitivity" of Rent's exponent ($\Delta\mu$) is defined as Rent's exponent for the pair of logic modules (or partitions) minus Rent's exponent for the first logic module (or partition) plus Rent's exponent for the pair of logic modules (or partitions) minus Rent's exponent for the second logic module (or partition). The system clusters logic modules or partitions that maximize the negative sensitivity of Rent's exponent ($-\Delta\epsilon$).

In one embodiment of the present invention, a user-specified parameter, $\alpha$, can be used to trade off between optimizing the partitioning process for timing and pin count. The system computes a delta weight ($\Delta\omega$) that is a linear combination of the sensitivity of the joint-utilization ratio ($\Delta\mu$) and the sensitivity of Rent's exponent ($\Delta\epsilon$): $\Delta\omega=\alpha*\Delta\mu+(1-\alpha)*(-\Delta\epsilon)$. As $\alpha$ approaches 1, the system optimizes for timing. As $\alpha$ approaches 0, the system optimizes for pin count. The default setting for $\alpha$ is 0.5. The system clusters logic modules or partitions into a new partition that maximizes $\Delta\omega$, without violating the size constraints on each partition. The process stops when user constraints are met.

Clustering Logic Modules into Partitions

Figure 5:
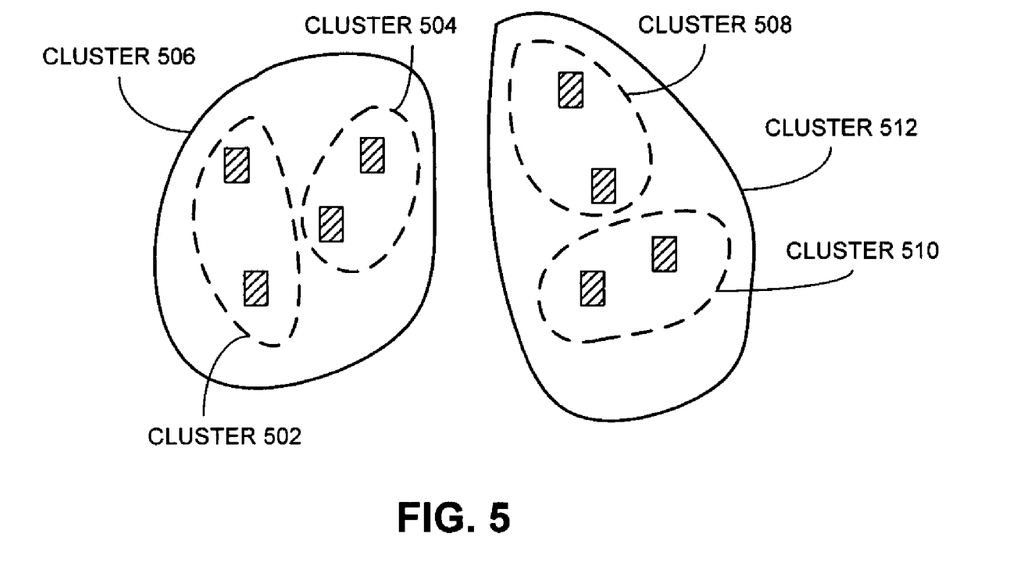
FIG. 5 illustrates clustering of logic modules into partitions in accordance with an embodiment of the present invention.

FIG. 5 illustrates clustering of logic modules into partitions in accordance with an embodiment of the present invention. It contains clusters 502, 504, 506, 508, 510, and 512.

During the clustering process, the system iteratively clusters logic modules together to form new partitions. In a first iteration, the system clusters two logic modules if that partition maximizes $\Delta\omega$. Clusters 502, 504, 508, and 510 result from the first stage of clustering. The system then repeats the process and clusters the clusters formed in the first iteration. Note that the system can also cluster a cluster from the first iteration and a logic module which has not been paired up with another logic module. In this case, the system groups clusters 502 and 504 into cluster 506, forming a new partition. Similarly, the system groups clusters 508 and 510 into cluster 512, forming a new partition.

Figure 6:
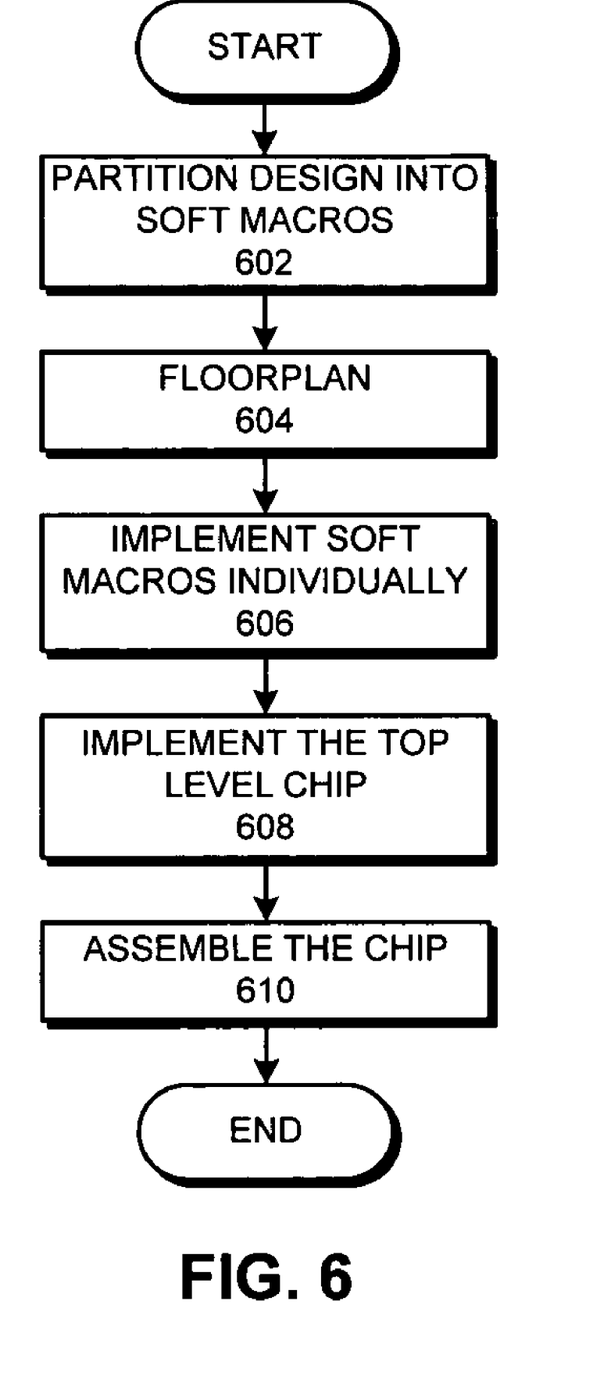
FIG. 6 presents a flow chart illustrating a standard partitioning process.

FIG. 6 presents a flow chart illustrating a standard partitioning process. The process begins when the system partitions a design into soft macros (step 602). A soft macro is a set of logic modules. As mentioned previously, larger IC designs must be partitioned into soft macros so that the logic optimization and place-and-route tools can operate on more manageable pieces of the IC design. Next, the system creates a floorplan (step 604) and implements each soft macro individually (step 606). The system then implements the top level chip (step 608) and assembles the chip (step 610). Note that the present invention modifies steps 602 and 604 in this standard partitioning process.

Figure 7:
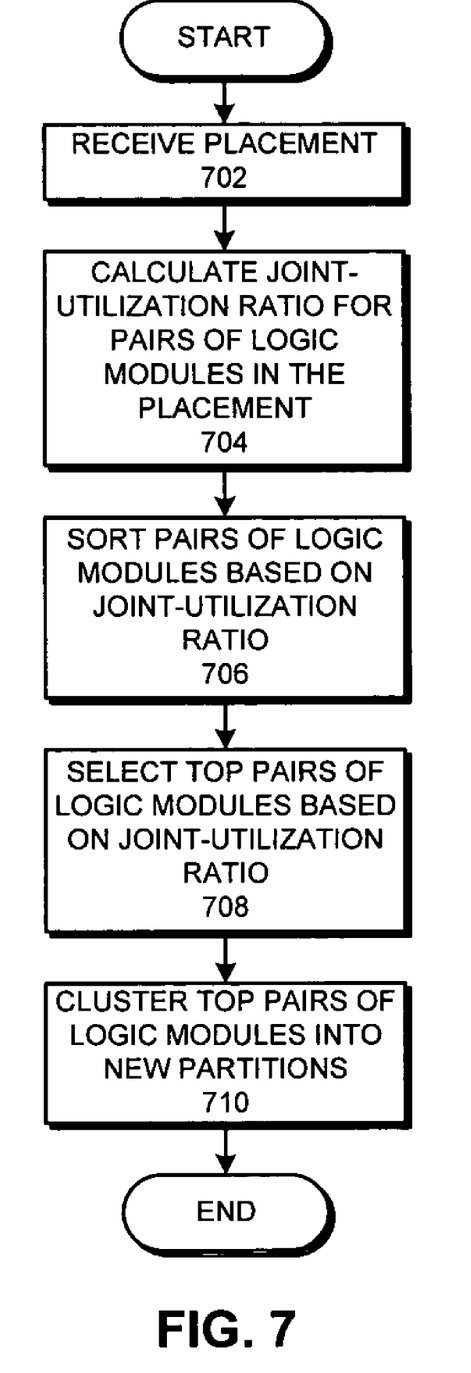
FIG. 7 presents a flow chart illustrating the process of grouping pairs of logic modules into partitions in accordance with an embodiment of the present invention.

FIG. 7 presents a flow chart illustrating the process of grouping pairs of logic modules into partitions in accordance with an embodiment of the present invention. It modifies steps 602 and 604 in FIG. 6.

The process in FIG. 7 begins when the system receives a flat placement (step 702). The system then calculates the joint-utilization ratio for pairs of logic modules in the placement (step 704). Next, the system sorts pairs of logic modules based on the joint-utilization ratios (step 706). The system then selects top pairs of logic modules based on the joint-utilization ratios (step 708). Finally, the system clusters top pairs of logic modules into new partitions (step 710). Note that the system can also operate on un-paired logic modules as well as partitions.

Note that the system can optimize for pin count by first calculating Rent's exponent at step 704, then sorting pairs of logic modules based on Rent's exponent at step 706, and finally selecting pairs of logic modules based on Rent's exponent at step 708.

Also note that the system can trade off optimizing timing and pin count by first calculating $\Delta\omega$ at step 704, then sorting pairs of logic modules based on $\Delta\omega$ at step 706, and finally selecting pairs of logic modules based on $\Delta\omega$ at step 710.

Note that after the system generates the partitions, the system discards the flat placement and executes the logic optimization and place-and-route tool on each partition.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for partitioning an integrated circuit, comprising:

receiving a placement for an integrated circuit;

calculating a joint-utilization ratio for pairs of logic modules in the placement, wherein the joint-utilization ratio for a pair of logic modules is the ratio of the total cell area for the pair of logic modules divided by the area of a bounding box for the pair of logic modules;

sorting the pairs of logic modules based on the joint-utilization ratio;

selecting top pairs of logic modules based on the joint-utilization ratio; and clustering the top pairs of logic modules into new partitions.

2. The method of claim 1, wherein a user-specified parameter determines the number of top pairs of logic modules to be clustered.

3. The method of claim 1, wherein the joint-utilization ratio indicates the extent to which cells of a pair of logic modules are co-mingled;

wherein the joint-utilization ratio is calculated by dividing a total cell area of the pair of logic modules by an area of a bounding box containing the pair of logic modules; and wherein a higher joint-utilization ratio indicates that the pair of logic modules has a preference to be clustered together.

4. The method of claim 1, further comprising:

determining if an instance limit of a partition has been reached;

if so, terminating the clustering process; and otherwise, continuing to cluster pairs of logic modules, un-paired logic modules, and previously created partitions into a new partition until the instance limit of the new partition has been reached.

5. The method of claim 4, wherein the instance limit is determined by an instance limit imposed by a place-and-route tool.

6. The method of claim 4, wherein the instance limit is determined by a number of instances per partition;

wherein the number of instances per partition is calculated by dividing a total number of instances by a user-specified number of partitions; and wherein the instance limit does not exceed an instance limit imposed by a place-and-route tool.

7. The method of claim 1, further comprising:

calculating Rent's exponent to facilitate minimizing pin count;

wherein Rent's exponent is a logarithm of a pin count divided by the logarithm of an instance count for a pair of logic modules; and wherein a lower Rent's exponent indicates a lower pin count.

8. The method of claim 7, further comprising:

calculating a sensitivity of the joint-utilization ratio;

calculating the sensitivity of Rent's exponent;

calculating a linear combination of the sensitivity of the joint-utilization ratio and the sensitivity of Rent's exponent; and maximizing the linear combination of the sensitivity of the joint-utilization ratio and the sensitivity of Rent's exponent;

wherein a tunable parameter is used to scale the sensitivity of the joint-utilization ratio relative to the sensitivity of Rent's exponent, thereby facilitating a trade-off between optimizing timing and optimizing pin count.

9. An apparatus for partitioning an integrated circuit, comprising:

a partitioning mechanism;

wherein the partitioning mechanism is configured to:

receive a placement for an integrated circuit;

calculate ajoint-utilization ratio for pairs of logic modules in the placement, wherein the joint-utilization ratio for a pair of logic modules is the ratio of the total cell area for the pair of logic modules divided by the area of a bounding box for the pair of logic modules;

sort the pairs of logic modules based on the joint-utilization ratio;

select top pairs of logic modules based on the joint-utilization ratio; and cluster the top pairs of logic modules into new partitions.

10. The apparatus of claim 9, wherein a user-specified parameter determines the number of top pairs of logic modules to be clustered.

11. The apparatus of claim 9, wherein the joint-utilization ratio indicates the extent to which cells of a pair of logic modules are co-mingled;

wherein the joint-utilization ratio is calculated by dividing a total cell area of the pair of logic modules by an area of a bounding box containing the pair of logic modules; and wherein a higher joint-utilization ratio indicates that the pair of logic modules has a preference to be clustered together.

12. The apparatus of claim 9, wherein the partitioning mechanism is configured to:

determine if an instance limit of a partition has been reached;

if so, to terminate the clustering process; and otherwise, to continue to cluster pairs of logic modules, un-paired logic modules, and previously created partitions into a new partition until the instance limit of the partition has been reached.

13. The apparatus of claim 12, wherein the instance limit is determined by an instance limit imposed by a place-and-route tool.

14. The apparatus of claim 12, wherein the instance limit is determined by a number of instances per partition;

wherein the number of instances per partition is calculated by dividing a total number of instances by a user-specified number of partitions; and wherein the instance limit does not exceed an instance limit imposed by a place-and-route tool.

15. The apparatus of claim 9, wherein the partitioning mechanism is configured to:

calculate Rent's exponent to facilitate minimizing pin count;

wherein Rent's exponent is a logarithm of a pin count divided by the logarithm of an instance count for a pair of logic modules; and wherein a lower Rent's exponent indicates a lower pin count.

16. The apparatus of claim 15, wherein the partitioning mechanism is configured to:
   calculate a sensitivity of the joint-utilization ratio;
   calculate the sensitivity of Rent's exponent;
   calculate a linear combination of the sensitivity of the joint-utilization ratio and the sensitivity of Rent's exponent; and
   maximize the linear combination of the sensitivity of the joint-utilization ratio and the sensitivity of Rent's exponent;
   wherein a tunable parameter is used to scale the sensitivity of the joint-utilization ratio relative to the sensitivity of Rent's exponent, thereby facilitating a trade-off between optimizing timing and optimizing pin count.

17. A computer system for partitioning an integrated circuit, comprising:
   a partitioning mechanism;
   wherein the partitioning mechanism is configured to:
      receive a placement for an integrated circuit;
      calculate a joint-utilization ratio for pairs of logic modules in the placement, wherein the joint-utilization ratio for a pair of logic modules is the ratio of the total cell area for the pair of logic modules divided by the area of a bounding box for the pair of logic modules;
   sort the pairs of logic modules based on the joint-utilization ratio;
   select top pairs of logic modules based on the joint-utilization ratio; and
   cluster the top pairs of logic modules into new partitions.

18. The computer system of claim 17, wherein a user-specified parameter determines the number of top pairs of logic modules to be clustered.

19. The computer system of claim 17,
   wherein the joint-utilization ratio indicates the extent to which cells of a pair of logic modules are co-mingled;
   wherein the joint-utilization ratio is calculated by dividing a total cell area of the pair of logic modules by an area of a bounding box containing the pair of logic modules; and
   wherein a higher joint-utilization ratio indicates that the pair of logic modules has a preference to be clustered together.

20. The computer system of claim 17, wherein the partitioning mechanism is configured to:
   determine if an instance limit of a partition has been reached;
   if so, to terminate the clustering process; and
   otherwise, to continue to cluster pairs of logic modules, un-paired logic modules, and previously created partitions into a new partition until the instance limit of the partition has been reached.

* * * * *

UNITED STATES PATENT AND TRADEMARK OFFICE
CERTIFICATE OF CORRECTION

| | | |
|---|---|---|
| PATENT NO. | : 7,260,802 B2 | Page 1 of 1 |
| APPLICATION NO. | : 11/159950 | |
| DATED | : August 21, 2007 | |
| INVENTOR(S) | : Pei-Hsin Ho | |

It is certified that error appears in the above-identified patent and that said Letters Patent is hereby corrected as shown below:

In claim 9 (at column 8, line 9), please delete the words, "ajoint-utilization" and replace with the word --a joint utilization--.

Signed and Sealed this

Twenty-third Day of October, 2007

JON W. DUDAS
*Director of the United States Patent and Trademark Office*